United States Patent [19]

Schlump

[11] Patent Number: 4,909,840
[45] Date of Patent: Mar. 20, 1990

[54] PROCESS OF MANUFACTURING NANOCRYSTALLINE POWDERS AND MOLDED BODIES

[75] Inventor: Wolfgang Schlump, Essen, Fed. Rep. of Germany

[73] Assignee: Fried. Krupp Gesellschaft mit beschränkter Haftung, Essen, Fed. Rep. of Germany

[21] Appl. No.: 178,646

[22] Filed: Apr. 7, 1988

[30] Foreign Application Priority Data

Apr. 29, 1987 [DE] Fed. Rep. of Germany ....... 3714239

[51] Int. Cl.$^4$ ............................................. C22L 29/12
[52] U.S. Cl. ....................................... 75/232; 75/228; 75/236; 75/244; 75/245; 75/246; 75/251; 75/254; 75/255; 419/12; 419/13; 419/14; 419/15; 419/16; 419/17; 419/48; 419/49; 419/62; 419/66
[58] Field of Search ................. 419/23, 33, 12–17, 419/48, 49, 62, 66; 75/254, 255, 252, 228, 232, 236, 244, 245, 246

[56] References Cited

U.S. PATENT DOCUMENTS

| | | | |
|---|---|---|---|
| 4,290,826 | 9/1981 | Clegg | 75/0.5 BA |
| 4,710,239 | 12/1987 | Lee et al. | 419/12 |
| 4,715,893 | 12/1987 | Skinner et al. | 75/249 |
| 4,743,317 | 5/1988 | Skinner et al. | 419/66 |
| 4,792,367 | 12/1988 | Lee | 419/23 |

OTHER PUBLICATIONS

Gleiter, H. et al., *Z. Metallkunde* [*Metallurgy*], V. 75, No. 40 (1984), pp. 263–267.
Birringer, R., et al., *Proc. JIMIS-4, Trans. of Jap. Inst. of Metals*, V. 27 (1986), pp. 43 et seq.

*Primary Examiner*—Stephen J. Lechert, Jr.
*Attorney, Agent, or Firm*—Spencer & Frank

[57] ABSTRACT

A process for the production of a secondary powder composition having a nanocrystalline structure and being comprised of binary or quasi-binary substances composed of at least one of the elements Y, Ti, Zr, Hf, Nb, Mo, Ta and W and at least one of the elements V, Cr, Mn, Fe, Co, Ni, Cu and Pd, optionally also containing further ingredients, such as Si, Ge, B and/or oxides, nitrides, borides, carbides, and their possible mixed crystals. The components are in powdered form and are mixed in elementary form or as pre-alloys and have particle sizes ranging from 2 to 250 μm. The powder components are subjected to high mechanical forces in order to produce secondary powders having a nanocrystalline structure. The secondary powders obtained in this way can be processed into molded bodies according to known compression molding processes, but at a temperature below the recrystallization temperature.

30 Claims, 2 Drawing Sheets

PROCESS OF MANUFACTURING NANOCRYSTALLINE POWDERS AND MOLDED BODIES

BACKGROUND OF THE INVENTION

1. Field of the Invention

The present invention relates to a process of manufacturing a secondary powder composition and a molded body, both of which have a nanocrystalline structure.

2. Description of the Related Art

Nanocrystalline materials are polycrystals having a crystal size on the order of a few nanometers. Such materials are known and are described, for example, by H. Gleiter and P. Marquart in Z. Metallkunde [Metallurgy], Volume 75, No. 40 (1984) pages 263–267 and by R. Birringer, U. Herre and H. Gleitner in Proc. JIMIS-4, Trans. of Jap. Inst. of Metals, Volume 27 (1986) pages 43 et seq, the disclosures of which are herein incorporated by reference. The structure of these materials which are polycrystals is essentially characterized by the fact that the crystallites have a size ranging from 1 to 10 nm. Thus, the volume percentage of incoherent interfaces for these materials is comparable to the volume percentage of crystalline regions, that is, these materials consist of about 50 vol% crystals (crystalline component) and 50 vol% grain-boundaries (interfacial component). In the interface regions, the atom arrangement on the macroscopic average has neither a long-range nor a close-range order and, thus the material has a gas-like character. Materials having a nanocrystalline structure constitute a novel solid state different from glasses and crystals. The properties of nanocrystalline materials differ from the properties of the same material in the crystalline and/or glassy state.

The above publications also mention processes for manufacturing nanocrystalline powders and their compaction into molded bodies. The most frequently used powder production processes for manufacturing nanocrystalline powders include: atomization in an electric arc, evaporation in an inert atmosphere or evaporation in a vacuum with subsequent isoentropic relaxation. The powders are collected in a recipient vessel and compacted in the same recipient vessel in a pressing matrix. These processes, however, are very expensive and are prohibitively expensive for the production of large quantities of nanocrystalline powder compositions and molded bodies.

SUMMARY OF THE INVENTION

It is therefore an object of the present invention to provide a process with which nanocrystalline powders of a certain group of materials can be produced in larger quantities than heretofore possible, which powders can then be compacted according to known methods to form molded bodies.

This is accomplished by a process for the production of a secondary powder composition having a nanocrystalline structure and being comprised of binary or quasi-binary, of ternary or quasi-ternary substances, the process comprising mixing powders of at least one element selected from a first group consisting of Y, Ti, Zr, Hf, Nb, Mo, Ta and W and at least one element selected from a second group consisting of V, Cr, Mn, Fe, Co, Ni, Cu and Pd to provide a powder mixture, said powders being in elementary form or having the form of prealloys, and having a particle size ranging from 2 to 250 μm; and subjecting said powder mixture to high mechanical forces under conditions effective to convert the powder mixture to a secondary powder having a nanocrystalline structure.

The powders is to be mixed in step (a) may further comprise at least one further ingredient selected from the group consisting of Si, Ge, B, and oxides, nitrides, borides, and carbides, and mixed crystals thereof.

Useful oxides, nitrides, borides and carbides are $Al_2O_3$, $Y_2O_3$, $ZrO_2$ and include those formed of transition metals such as Ti, Nb, W, Mo and V.

Thus, powders in commercially available particle sizes between 2 and 250 μm of the selected elements in pure form or as pre-alloys of these respective groups are converted by high mechanical forces to secondary powders having a nanocrystalline structure whose powder particles exhibit a very high degree of space filling.

The high mechanical forces may act on the powders according to various methods. The conversion according to the invention to a secondary powder composition having a nanocrystalline structure is realized, for example, by cold forming or high energy grinding. In particular, the high energy grinding process can be performed by means of an Attritor.

The attritor employed was manufactured by Krupp with horizontal stirring and is a high energy grinding equipment. The nanocrystalline structures are realized by mechanically alloying. This process incorporates grinding, cooled welding und and fracture of the powder particles by high mechanical forces with usefull ranges between 8 and 25 g of the milling balls.

From this secondary powder composition, molded bodies are produced by conventional compression methods known in the powder metallurgy art, such as, for example, extrusion, powder forging, hot pressing, hot isostatic pressing and, sintering, preferably at temperatures below, most preferably at temperatures substantially below, the recrystallization temperature.

In a special embodiment of the process according to the invention, the components of the secondary powder composition are selected in such a manner that their constitution/phase diagram exhibits a distinct eutectic or eutectoid reaction and the powdery components are mixed in a mixing ratio which lies outside of the marginal solubility. destinated by the phase diagram of the system. For example in the system Ti-Ni this means a composition range for Ni between 15 and 85 weight percent and for the system Cu-Ta a composition range for Ta between 10 and 90 weight percent.

DESCRIPTION OF THE PREFERRED EMBODIMENTS

The following examples of embodiments of the invention are given by way of illustration but not limitation.

Figure 1:
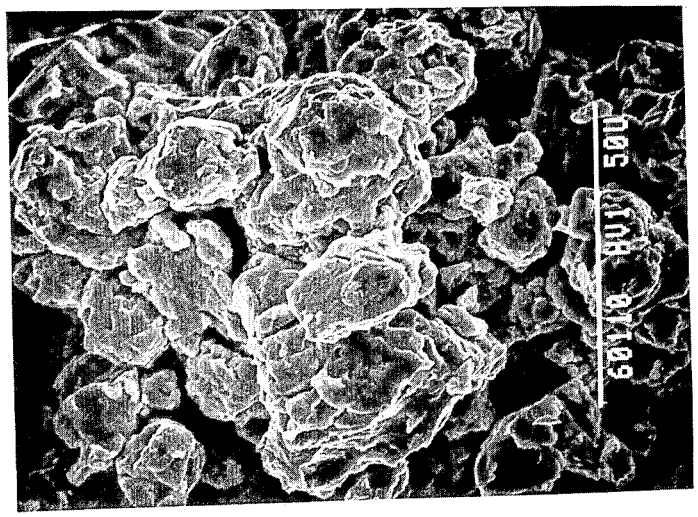
FIG. 1 is a photomicrograph showing the nanocrystalline structure of a secondary powder composition according to the invention.

In one embodiment of the invention, Ti powder (average particles size 70 μm) was mixed with Ni powder (average particle size 5 μm) in a quantity ratio of 70:30 and was ground in a horizontally disposed Attritor as the high energy grinding means. The weight of the powder charge was 1000 g. Grinding was effected with the use of roller bearing balls having a diameter of about 6 mm. The mass ratio of balls to powder was 20:1. The grinding was continued for 90 hours with the stirring arm of the Attritor rotating at 200 rpm. FIG. 1 is a photomicrograph showing the nanocrystalline structure of the resulting secondary powder. The secondary powder was composed of α-Ti and α-Ni and mixed crystals having a grain size of ≦10 nm. The degree of space filling was determined to be at least 90%.

Figure 2:
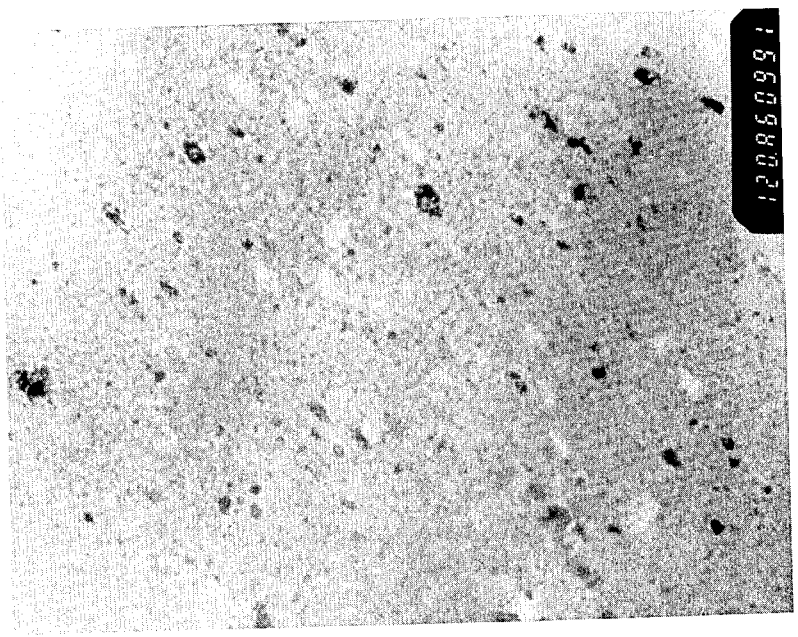
FIGS. 2 and 3 are photomicrographs showing the nanocrystalline structure of a molded body according to the invention produced by hot isostatic pressing of a secondary powder composition according to the invention.
Figure 3:
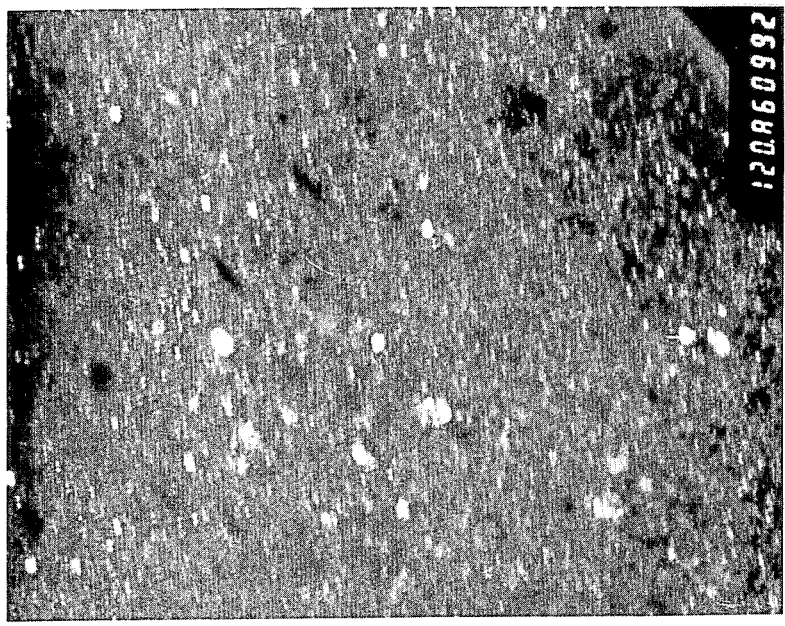

This powder was pressed into a molded body using hot isostatic pressing for one hour at temperatures up to 500° C. and a pressure of 2000 bar in an argon atmosphere. FIGS. 2 and 3 are photomicrographs showing the nanocrystalline structure of the resulting molded body.

Figure 4:
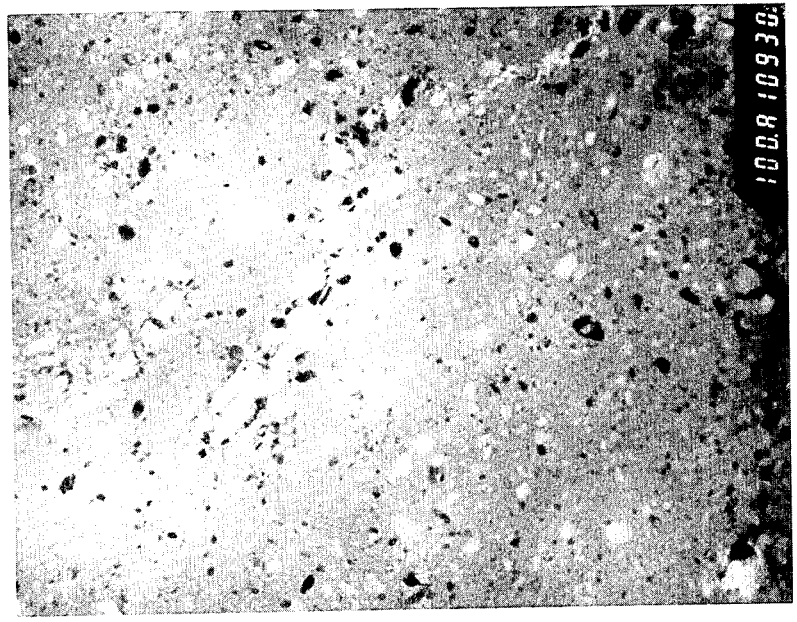
FIG. 4 is a photomicrograph showing the nanocrystalline structure of another molded body according to the invention formed by hot isostatic pressing of another secondary powder composition according to the invention.

In a further embodiment of the invention, a nickel-base alloy APK 1, the components of which are listed in Table I below and the form of which is a powder having an average particle size of 60 μm, was mixed with 6% by weight zirconium powder. The mixture was ground and compacted under the same conditions as in the previous embodiment. FIG. 4 is a photomicrograph showing the nanocrystalline structure of the resulting molded body.

TABLE I

| Chemical Analysis of APK 1 in percent by mass: | | | | | |
|---|---|---|---|---|---|
| Cr | Mo | Co | Al | Ti | Ni |
| 15.0 | 5.2 | 17.1 | 4.0 | 3.5 | remainder |

Using similar process parameters, TiCr, NiZr and tool steel containing Ti carbide and/or Nb carbide were also succesfully processed mechanically into secondary powders having a nanocrystalline structure and into molded bodies. For example Ti and Cr powders were mixed in a ratio of 70:30 (weight percent) and mechanically alloyed in the attritor for 90 hours. The process was done under vacuum with a rotation speed of the stirring of 200 revolution per minit. The balls to powder ration in the attritor was 20:1.

The present disclosure relates to the subject matter disclosed in Federal Republic of Germany Patent Application No. P 37 14 239.9, filed Apr. 29th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A process for the production of a secondary powder composition having a nanocrystalline structure and being comprised of binary or quasi-binary substances, the process comprising:
   (a) mixing powders of at least one element selected from a first group consisting of Y, Ti, Zr, Hf, Nb, Mo, Ta and W and at least one element selected from a second group consisting of V, Cr, Mn, Fe, Co, Ni, Cu and Pd to provide a powder mixture, said powders being in elementary form or having the form of prealloys, and having a particle size ranging from 2 to 250 μm; and
   (b) subjecting said powder mixture to high mechanical forces under conditions effective to convert the powder mixture to a secondary powder having a nanocrystalline structure.

2. The process according to claim 1, wherein the powders to be mixed in step (a) further comprise at least one further ingredient selected from the group consisting of Si, Ge, B, and oxides, nitrides, borides, and carbides, and mixed crystals thereof.

3. The process according to claim 1, wherein step (b) is accomplished by cold forming.

4. The process according to claim 1, wherein step (b) is accomplished by high energy grinding.

5. The process according to claim 4, wherein high energy grinding is accomplished in an attritor.

6. A process for the production of a molded article having a nanocrystalline structure and comprised of binary or quasi-binary substances, the process comprising:
   (a) mixing powders of at least one element selected from a first group consisting of Y, Ti, Zr, Hf, Nb, Mo, Ta and W and at least one element selected from a second group consisting of V, Cr, Mn, Fe, Co, Ni, Cu and Pd to provide a powder mixture, said powders being in elementary form or having the form of prealloys, and having a particle size ranging from 2 to 250 μm;
   (b) subjecting said powder mixture to high mechanical forces under conditions effective to convert the powder mixture to a secondary powder having a nanocrystalline structure; and
   (c) compression molding the secondary powder under conditions effective to provide the molded article.

7. The process according to claim 6, wherein the secondary powder has a recrystallization temperature and wherein step (c) proceeds at a temperature which is below the recrystallization temperature of the secondary powder.

8. The process according to claim 6, wherein step (c) is accomplished by hot isostatic pressing.

9. The process according to claim 6, wherein the powders to be mixed in step (a) further comprise at least one further ingredient selected from the group consisting of Si, Ge, B, and oxides, nitrides, borides, and carbides, and mixed crystals thereof.

10. The process according to claim 6, wherein step (b) is accomplished by cold forming.

11. The process according to claim 6, wherein step (b) is accomplished by high energy grinding.

12. The process according to claim 11, wherein high energy grinding is accomplished in an attritor.

13. A secondary powder composition having a nanocrystalline structure, being comprised of binary or quasi-binary substances, and being prepared by a process comprising:
   (a) mixing powders of at least one element selected from a first group consisting of Y, Ti, Zr, Hf, Nb, Mo, Ta and W and at least one element selected from a second group consisting of V, Cr, Mn, Fe, Co, Ni, Cu and Pd to provide a powder mixture, said powders being in elementary form or having the form of prealloys, and having a particle size ranging from 2 to 250 µm; and (b) subjecting said powder mixture to high mechanical forces under conditions effective to convert the powder mixture to a secondary powder having a nanocrystalline structure.

14. The secondary powder composition according to claim 13, wherein the powders to be mixed in step (a) further comprise at least one further ingredient selected from the group consisting of Si, Ge, B, and oxides, nitrides, borides, and carbides, and mixed crystals thereof.

15. The secondary powder composition according to claim 13, wherein step (b) is accomplished by cold forming.

16. The secondary powder composition according to claim 13, wherein step (b) is accomplished by high energy grinding.

17. The secondary powder composition according to claim 16, wherein high energy grinding is accomplished in an attritor.

18. The secondary powder composition according to claim 13, wherein the powder mixture of step (a) is composed of one element selected from the first group and a plurality of elements selected from the second group.

19. The secondary powder composition according to claim 13, wherein the powder mixture of step (a) is composed of a plurality of elements selected from the first group and one element selected from the second group.

20. The secondary powder composition according to claim 13, wherein the powders mixed in step (a) comprise an alloy system, wherein the constitution/phase diagram exhibits a eutectic or eutectoid reaction, and wherein the powders are mixed in a mixing ratio selected to lie outside the marginal solubilities of the powders of the alloy system.

21. A molded article having a nanocrystalline structure, being comprised of binary or quasi-binary substances, and being prepared by a process comprising:

(a) mixing powders of at least one element selected from a first group consisting of Y, Ti, Zr, Hf, Nb, Mo, Ta and W and at least one element selected from a second group consisting of V, Cr, Mn, Fe, Co, Ni, Cu and Pd to provide a powder mixture, said powders being in pure form or having the form of prealloys, and having a particle size ranging from 2 to 250 µm;

(b) subjecting said powder mixture to high mechanical forces under conditions effective to convert the powder mixture to a secondary powder having a nanocrystalline structure; and (c) compression molding the secondary powder under conditions effective to provide the molded article.

22. The molded article according to claim 21, wherein the secondary powder has a recrystallization temperature and wherein step (c) proceeds at a temperature which is below the recrystallization temperature of the secondary powder.

23. The molded article according to claim 21, wherein step (c) is accomplished by hot isostatic pressing.

24. The molded article according to claim 21, wherein the powders to be mixed in step (a) further comprise at least one further ingredient selected from the group consisting of Si, Ge, B, and oxides, nitrides, borides, and carbides, and mixed crystals thereof.

25. The molded article according to claim 21, wherein step (b) is accomplished by cold forming.

26. The molded article according to claim 21, wherein step (b) is accomplished by high energy grinding.

27. The molded article according to claim 26, wherein high energy grinding is accomplished in an attritor.

28. The molded article according to claim 21, wherein the powder mixture of step (a) is composed of one element selected from the first group and a plurality of elements selected from the second group.

29. The molded article according to claim 21, wherein the powder mixture of step (a) is composed of a plurality of elements selected from the first group and one element selected from the second group.

30. The molded article according to claim 21, wherein the powders mixed in step (a) comprise an alloy system, wherein the alloy system exhibits a eutectic or eutectoid reaction, and wherein the powders are mixed in a mixing ratio selected to lie outside the marginal solubilities of the powders of the alloy system.

* * * * *